United States Patent Office 3,144,347
Patented Aug. 11, 1964

3,144,347
MONOHYDROXY ORGANIC ACID COMPOUNDS FOR IMPROVING THE PROPERTIES OF CEMENT, CONCRETE, AND MORTARS
Zach S. Cowan, Jr., Atlanta, Ga., assignor to E. I. du Pont de Nemours and Company, Wilmington, Del., a corporation of Delaware
No Drawing. Filed Feb. 13, 1962, Ser. No. 172,879
16 Claims. (Cl. 106—90)

This invention relates to compositions and methods utilizing monohydroxy organic acid compounds for improving the properties of cement, concrete and mortars.

According to the present invention a small class of monohydroxy organic compounds has been found which not only serves as excellent water reducing retardants but at the same time causes a significant increase in the compressive strength of the concrete. These compounds are hydroxyacetic acid, lactic acid, and their lactides and sodium, calcium, potassium, and amine salts. Hydroxyacetic acid is also identified as glycolic acid.

A particular advantage of these compounds is that the benefits referred to above are obtained according to this invention without deleterious effects on other properties of the concrete or mortar, such as flexural strength, resistance to freezing and thawing, bonding to steel, volume change, and the like. The compounds within this invention are also far less expensive than currently used retardants.

The monohydroxy compound of this invention will ordinarily be used in the range from about 0.001 to 3.5 percent by weight based on the weight of the cement. Most often less than about 0.8 weight percent will be used, and particularly advantageous results are obtained within the narrow range of 0.01 to 0.1 weight percent.

Thus, in a particularly important embodiment of this invention, a novel and useful composition is developed which contains the usual components of cement which are well known in the art, and additionally the above indicated amount of the monohydroxy compound. These components in this dry cement composition can be admixed by conventional means and techniques, including in one of the routine cement manufacture steps such as the finish grinding operation where the monohydroxy compound is a solid, or can be conveniently added with mixing to the already dry cement.

The dry cement will be used to prepare concrete according to known methods. For example, the dry cement composition will be suitably admixed with proper amounts of aggregate and water, optionally including other additives as will be readily understood, prior to forming or shaping the resulting mass. These ingredients mixed together can be conveniently referred to as a plastic cement intermediate product and it will be readily understood that this plastic cement intermediate product will contain in addition to the cement, aggregate and water from about 0.001 to about 1.0 percent by weight of one or more of the monohydroxy compounds within this invention based on the weight of the dry cement ingredient component. The preferred range for the monohydroxy component will of course also apply here.

It will be understood that this plastic cement intermediate product is poured and shaped to form the concrete mass by standard techniques and the resulting concrete products are also embraced within the scope of this invention.

It will be understood from the above that the present invention includes admixing the monohydroxy organic compound according to this invention with the dry cement, or in the alternative admixing it later with one or more of the other components in the preparation of the concrete prior to admixing with the dry cement, or in a further alternative admixing it as a separate ingredient in the set mass in the last step of preparing the concrete plastic cement intermediate product prior to forming.

It will be noted that, although the acids and their calcium salts are normally solid at room temperature, they can be effectively utilized as aqueous solutions, preferably of relative high concentration. Of course in liquid form these compounds would be unsuitable for admixture and sale as an ingredient in a dry cement product. However, the normally solid monohydroxy acids, salts and lactides can readily be admixed with the dry cement. If it is desired to use these materials by addition directly to the wet mass prior to formation of concrete, it is preferred that the material be an aqueous solution of hydroxyacetic acid or lactic acid or a mixture of these.

In order to permit the packaging and sale of a standard cement product suitable for use where no monohydroxy component is required, it will be preferable to add the monohydroxy component to the wet concrete mass at the time the concrete batch is being mixed, such as immediately prior to or during mixing.

The lactides of hydroxyacetic acid and lactic acid referred to above can of course be in either cyclic or straight chain form, as will be readily understood. It will also be recognized that the acids probably convert promptly to the form of the calcium salt upon addition to a wet intermediate product.

It will also be recognized that the lactides useful herein are merely dehydration products of the corresponding monohydroxy acids. The lactides can be obtained upon heating the acids and the lactides readily hydrolyze back to the acids upon use in the processes of this invention. When using one or both of the lactides within this invention normal alkaline components of the wet intermediate product catalyze the hydrolysis of these lactides to the corresponding monohydroxy acids.

The monohydroxy acid compounds can of course be used in the compositions and processes of this invention, if desired, with one or more other water reducing retardant agents, as well as with conventional air-entraining agents that serve as a foam or froth stabilizer such as natural resins, tallows, oils and soaps; gas-forming agents such as aluminum powder; natural cementing materials such as natural cements, hydraulic limes, and water-quenched blast-furnace slag; pozzolanic materials such as finely divided siliceous and aluminus materials including fly ash, heat-treated diatomaceous earths and heat-treated raw clays or shales. These materials are well known in the art and can be used in their usual proportions to obtain their desired effect on the properties of the resulting concrete. An excellent description of such admixture materials can be found in the Encyclopedia of Chemical Technology edited by Raymond E. Kirk and Donald F. Othmer, vol. 3, pages 411–491 (1949).

Of particular importance according to the present invention is the flexibility obtained in achieving desired properties for use in any particular application. For example, by use of the monohydroxy compounds within this invention it is possible to effect reasonable plasticity and excellent compressive strength at lower levels of cement ratio in the concrete mix.

Thus by practice of this invention one can obtain in addition to the excellent water reducing retardant benefits obtained by this invention, unexpectedly large improvement in compressive strength in the resulting concrete. In the alternative, it will be clear that it is now possible according to this invention to use a reduced amount of cement in the preparation of a desired concrete and still obtain excellent plasticity and the same or higher compressive strength than with a control mix. For example, comparative tests show as good as or better plasticity properties using the compounds within this invention compared to known water reducing retardant compounds, and at the same time improvements of 20%, 25% and even higher in compressive strength when compared with control mixes. An outstanding advantage of the use of these compounds is their extremely low cost compared with known water reducing retardants now used in the trade.

This invention will be better understood by reference to the following illustrative examples wherein indicated figures and percentages are by weight unless otherwise indicated.

EXAMPLE 1

*Lactic Acid 44% Aqueous Solution*

The following compositions are prepared:

MATERIALS PER CUBIC YARD OF CONCRETE

|  | Control mix | Test mix |
| --- | --- | --- |
| Admixture | None | 7.0 lbs. lactic acid 44%. |
| Cement, lbs | 517 | 517. |
| Fine aggregate (sand), lbs | 1,225 | 1,250. |
| Coarse aggregate, lbs | 1,925 | 1,962. |
| Water, gals | 39.0 | 37.5. |
| Type coarse aggregate | Consolidated No. 57. | Consolidated No. 57. |
| Brand of cement | Penn-Dixie | Penn-Dixie. |
| Slump, inches | 3¾ | 3¾. |
| Average compressive strength (standard tests): 28 days, pounds per sq. in. | 4,100 | 5,370. |

EXAMPLE 2

*Diglycolic Acid, the Linear Lactide of Hydroxyacetic Acid*

The following compositions are prepared:

MATERIALS PER CUBIC YARD OF CONCRETE

|  | Control mix | Test mix |
| --- | --- | --- |
| Admixture | None | 18.0 lbs. diglycolic acid. |
| Cement, lbs | 517 | 517. |
| Fine aggregate (sand), lbs | 1,195 | 1,226. |
| Coarse aggregate | 1,995 | 1,962. |
| Water, gals | 39.0 | 39.0. |
| Type coarse aggregate | Tyrone No. 57 | Tyrone No. 57. |
| Brand of cement | Southern | Southern. |
| Slump, inches | 4.0 | 5.5. |
| Average compressive strength (standard tests): 28 days, pounds per sq. in. | 3,570 | 4,880. |

EXAMPLE 3

*Calcium Hydroxyacetate, the Calcium Salt of Hydroxyacetic Acid*

The following compositions are prepared:

MATERIALS PER CUBIC YARD OF CONCRETE

|  | Control mix | Test mix |
| --- | --- | --- |
| Admixture | None | 4.0 lbs. calcium hydroxyacetate. |
| Cement, lbs | 517 | 517. |
| Fine aggregate (sand), lbs | 1,225 | 1,240. |
| Coarse aggregate, lbs | 1,925 | 1,925. |
| Water, gals | 39.0 | 37.5. |
| Type coarse aggregate | Consolidated No. 57. | Consolidated No. 57. |
| Brand of cement | Penn-Dixie | Penn-Dixie. |
| Slump, inches | 3¾ | 3¾. |
| Average compressive strength (standard tests): 28 days, pounds per sq. in. | 4,100 | 5,820. |

EXAMPLE 4

*Hydroxyacetic Acid 70% Aqueous Solution at Same Cement Factor*

The following compositions are prepared:

MATERIALS PER CUBIC YARD OF CONCRETE

|  | Control mix | Test mix |
| --- | --- | --- |
| Admixture | None | 3.62 lbs. hydroxyacetic 70% solution. |
| Cement, lbs | 517 | 517. |
| Fine aggregate (sand) | 1,225 | 1,250. |
| Coarse aggregate, lbs | 1,925 | 1,962. |
| Water, gals | 39.0 | 37.0. |
| Type coarse aggregate | Consolidated No. 57. | Consolidated No. 57. |
| Brand of cement | Penn-Dixie | Penn-Dixie. |
| Slump, inches | 3¾ | 3¾. |
| Average compressive strength (standard tests): 28 days, pounds per sq. in. | 4,100 | 5,620. |

EXAMPLE 5

*Hydroxyacetic Acid 70% Solution at Reduced Cement Factor*

The following compositions are prepared:

MATERIALS PER CUBIC YARD OF CONCRETE

|  | Control mix | Test mix |
| --- | --- | --- |
| Admixture | None | 3.62 lbs. hydroxyacetic 70% solution. |
| Cement, lbs | 517 | 447. |
| Fine aggregate (sand) | 1,226 | 1,265. |
| Coarse aggregate, lbs | 1,925 | 1,987. |
| Water, gals | 39.0 | 37.0. |
| Type coarse aggregate | Consolidated No. 57. | Consolidated No. 57. |
| Brand of cement | Penn-Dixie | Penn-Dixie. |
| Slump, inches | 4 | 4. |
| Average compressive strength (standard tests): 28 days, pounds per sq. in. | 4,250 | 6,740. |

EXAMPLE 6

*Sodium Hydroxyacetate*

The following compositions are prepared:

MATERIALS PER CUBIC YARD OF CONCRETE

|  | Control mix | Test mix |
| --- | --- | --- |
| Admixture | None | 4.0 lbs. sodium hydroxyacetate. |
| Cement, lbs | 517 | 517. |
| Fine aggregate (sand) | 1,225 | 1,240. |
| Coarse aggregate, lbs | 1,925 | 1,950. |
| Water, gals | 39.0 | 37.0. |
| Type coarse aggregate | Consolidated No. 57. | Consolidated No. 57. |
| Brand of cement | Penn-Dixie | Penn-Dixie. |
| Slump, inches | 3¾ | 3¾. |
| Average compressive strength (standard tests): 28 days, pounds per sq. in. | 4,100 | 5,610. |

ADDITIONAL EXAMPLES

The preceding examples are repeated substituting like amounts of the potassium and amine salts of hydroxyacetic acid and lactic acid for the acids and salts of those examples with corresponding excellent results.

The foregoing detailed description has been given for clearness of understanding only and no unnecessary limitations are to be understood therefrom. The invention is not limited to the exact details shown and described, for obvious modifications will occur to those skilled in the art.

The invention claimed is:

1. Inorganic cement containing in addition to its usual components from about 0.001 to 3.5 weight percent of a compound selected from the group consisting of hydroxy-acetic acid, lactic acid, and their lactides and calcium, sodium, potassium, and amine salts.

2. An intermediate product comprising inorganic cement, aggregate, water and from about 0.001 to 3.5 percent by weight based on the weight of the cement of a compound selected from the group consisting of hydroxyacetic acid, lactic acid, and their lactides and sodium, potassium, calcium and amine salts.

3. Inorganic concrete containing 0.001 to 3.5 percent by weight based on the weight of the inorganic cement used of a compound selected from the group consisting of hydroxyacetic acid, lactic acid, and their lactides and sodium, potassium, calcium and amine salts.

4. The method of making improved inorganic concrete or mortar comprising admixing with at least one of the components of the concrete or mortar from about 0.001 to 3.5 percent by weight based on the weight of the inorganic cement used of a compound selected from the group consisting of hydroxyacetic acid, lactic acid, and their lactides and sodium, potassium, calcium and amine salts.

5. Inorganic cement as set forth in claim 1 wherein said compound is hydroxyacetic acid.

6. Inorganic cement as set forth in claim 1 wherein said compound is calcium hydroxyacetate.

7. Inorganic cement as set forth in claim 1 wherein said compound is sodium hydroxyacetate.

8. An intermediate product as set forth in claim 2 wherein said compound is hydroxyacetic acid.

9. An intermediate product as set forth in claim 2 wherein said compound is calcium hydroxyacetate.

10. An intermediate product as set forth in claim 2 wherein said compound is sodium hydroxyacetate.

11. Inorganic concrete as set forth in claim 3 wherein said compound is hydroxyacetic acid.

12. Inorganic concrete as set forth in claim 3 wherein said compound is calcium hydroxyacetate.

13. Inorganic concrete as set forth in claim 3 wherein said compound is sodium hydroxyacetate.

14. The method as set forth in claim 4 wherein said compound is hydroxyacetic acid.

15. The method as set forth in claim 4 wherein said compound is calcium hydroxyacetate.

16. The method as set forth in claim 4 wherein said compound is sodium hydroxyacetate.

References Cited in the file of this patent

UNITED STATES PATENTS

| | | |
|---|---|---|
| 2,672,424 | Avery | Mar. 16, 1954 |
| 2,880,102 | Woodard et al. | Mar. 31, 1959 |

OTHER REFERENCES

Lea et al.: "The Chemistry of Cement and Concrete," Arnold (Publishers) Ltd., London, 1956, page 521 and pages 574–576.